United States Patent
Heudis

(10) Patent No.: US 11,458,925 B2
(45) Date of Patent: Oct. 4, 2022

(54) AIRBAG MODULE FOR THE REDUCTION OF AN ABRUPT SIDEWARD AND ALSO FORWARD MOVEMENT OF AN OCCUPANT

(71) Applicant: ISI AUTOMOTIVE HOLDING GMBH, Vienna (AT)

(72) Inventor: Franziska Heudis, Berlin (DE)

(73) Assignee: ISI AUTOMOTIVE HOLDING GMBH, Vienna (AT)

(*) Notice: Subject to any disclaimer, the term of this patent is extended or adjusted under 35 U.S.C. 154(b) by 0 days.

(21) Appl. No.: 17/336,956

(22) Filed: Jun. 2, 2021

(65) Prior Publication Data

US 2021/0380065 A1    Dec. 9, 2021

(30) Foreign Application Priority Data

Jun. 3, 2020 (DE) ..................... 10 2020 114 750.3

(51) Int. Cl.
*B60R 21/233* (2006.01)
*B60R 21/264* (2006.01)
*B60R 21/231* (2011.01)

(52) U.S. Cl.
CPC .......... *B60R 21/233* (2013.01); *B60R 21/231* (2013.01); *B60R 21/23138* (2013.01); *B60R 21/264* (2013.01)

(58) Field of Classification Search
CPC ................ B60R 21/233; B60R 21/264; B60R 21/23138; B60R 21/231
See application file for complete search history.

(56) References Cited

U.S. PATENT DOCUMENTS 5,575,497 A * 11/1996 Suyama ................ B60R 21/231
280/730.2
7,549,672 B2 * 6/2009 Sato .................... B60R 21/2338
280/730.2

(Continued)

FOREIGN PATENT DOCUMENTS

DE   10 2012 216 896 A1   3/2013
DE   10 2014 002 536 A1   8/2015
DE   10 2018 120 159 A1   9/2019

OTHER PUBLICATIONS

DE Office Action in Application No. 10 2020114 740.3 dated Feb. 11, 2021.

*Primary Examiner* — Paul N Dickson
*Assistant Examiner* — Tiffany L Webb
(74) *Attorney, Agent, or Firm* — Maschoff Brennan

(57) ABSTRACT

An airbag module reduces abrupt sideward and forward movement of an occupant in the case of an impact. The airbag module has an airbag which can be inflated by a gas generator in the case of the onset of an accident situation. The airbag includes a main restraining chamber and an additional restraining chamber which are connected to one another by a passage opening. The main restraining chamber, in an inflated state, restrains sideward movement of an occupant. The additional restraining chamber, in the inflated state, unfurls, starting from the main restraining chamber, at least with a section in front of the occupant and to restrain at least a forward movement of the occupant. The additional restraining chamber and the main restraining chamber are arranged to overlap one another at least partially in the sense that they are configured at least partially behind one another in side view.

18 Claims, 6 Drawing Sheets

(56) References Cited

U.S. PATENT DOCUMENTS

| | | | |
|---|---|---|---|
| 8,684,408 B2 | 4/2014 | Thomas et al. | |
| 9,809,189 B2 * | 11/2017 | Grell | B60R 21/2334 |
| 10,207,670 B2 | 2/2019 | Attenberger | |
| 10,232,816 B2 * | 3/2019 | Fujiwara | B60R 21/01 |
| 10,336,283 B2 * | 7/2019 | Rickenbach | B60R 21/233 |
| 10,486,638 B2 * | 11/2019 | Kwon | B60R 21/23138 |
| 10,543,801 B2 * | 1/2020 | Kwon | B60R 21/233 |
| 10,870,405 B2 | 12/2020 | Kwon | |
| 10,933,836 B2 * | 3/2021 | Yoo | B60R 21/207 |
| 10,974,683 B2 * | 4/2021 | Zhuang | B60R 21/2342 |
| 2006/0131847 A1 | 6/2006 | Sato et al. | |
| 2017/0210329 A1 * | 7/2017 | Rao | B60N 2/75 |

* cited by examiner

AIRBAG MODULE FOR THE REDUCTION OF AN ABRUPT SIDEWARD AND ALSO FORWARD MOVEMENT OF AN OCCUPANT

FIELD OF THE INVENTION

The present invention relates to an airbag module, in particular for a motor vehicle, for the reduction of an abrupt sideward and also forward movement of an occupant in the case of an impact with an airbag which can be inflated by means of a gas generator in the case of the onset of an accident situation.

BACKGROUND OF THE INVENTION

It is known to use airbag modules for the reduction or restriction of the freedom of movement of an occupant in the case of a side impact and also a frontal impact, which airbag modules comprise an airbag which can be inflated by means of a gas generator in the case of the onset of an accident situation.

Here, in addition to what are known as side airbags which, in the inflated state, are situated between an occupant and the vehicle body or door trim panel which lies close to said occupant, what are known as interaction, center or central area airbags are also increasingly being used which, in the inflated state, are arranged between the two occupants who are situated next to one another in the vehicle in a seat row. Moreover, what are known as door panel airbags and also rear side airbags are also increasingly being used which are installed in the door panels or in the rear region of a vehicle body and, in the case of a side impact and possibly oblique load case (this is an obliquely oriented frontal and side impact and possibly a frontal impact which is arranged offset with respect to the main vehicle axis), act as a side airbag.

In other words, an airbag or side airbag may be arranged in the inflated state to the side of the occupants and between the occupants in the case of a side impact and possibly oblique load case. A side airbag of this type offers protection, however, only to a limited extent in particular in the case of an oblique load case, since not only lateral forces but also high frontal forces act in the case of an impact of this type, for example between two vehicles.

In order to overcome the above-described disadvantage, DE 10 2012 216 896 A1 discloses an airbag for use in motor vehicles, the airbag being arranged in a backrest of a seat and comprising a tether. Here, in the case of triggering of the airbag, the tether ensures shaping of the airbag toward the occupant and, as a result, reduces a sideward and forward movement of the occupant. By way of the shaping or bending of the upper chamber region on the roof side of the airbag in the direction of the occupant by way of the tether, however, a direct absorption of any frontal forces is possible only to a limited or restricted extent, since direct restraining of the occupant is not ensured.

It is therefore an object of the invention to provide an airbag module, by way of which the occupant is held in his/her seat even in the case of any interaction of lateral and frontal forces. In other words, the occupant who is moving sideward and possibly forward on account of a side impact or possibly oblique load case is to be held in the seat or is to be pushed back into his/her seat position.

SUMMARY OF THE INVENTION

The invention regards an airbag module comprising an airbag, wherein the airbag comprises a main restraining chamber and an additional restraining chamber which are connected to one another by way of a passage opening.

According to aspects of the invention the main restraining chamber is provided and configured, in the inflated state, to restrain a sideward movement of an occupant, and the additional restraining chamber is provided and configured, in the inflated state, to extend, starting from the main restraining chamber, at least with a section in front of the occupant and to restrain at least a forward movement of the occupant, the additional restraining chamber and the main restraining chamber being arranged so as to overlap one another at least partially in the sense that they are configured at least partially behind one another in side view.

Aspects of the invention are thus based on the concept of providing an airbag with a main restraining chamber and an additional restraining chamber, the main restraining chamber restraining or reducing a sideward movement of an occupant, and the additional restraining chamber restraining or reducing at least a forward movement of an occupant. This is made possible by the additional restraining chamber and the main restraining chamber being arranged in an overlapping manner, that is to say being configured at least partially behind one another in side view. This means that the main restraining chamber and the additional restraining chamber extend at least partially in the x-z planes which are offset in relation to the vehicle transverse axis y, with the result that body regions of the occupant which are spaced apart laterally, for instance first the shoulder region and secondly the chest or abdomen region, can be restrained separately by way of the two chambers.

In other words, the additional restraining chamber unfurls, starting from the main restraining chamber which reduces a sideward movement, at least with a section in front of the vehicle occupant. Unfurling of this type can take place at an angle or in parallel with respect to the vehicle vertical axis and from top to bottom or from bottom to top.

The feature that the additional restraining chamber is provided and configured to extend at least with a section in front of the occupant includes, as a design variant, that the additional restraining chamber extends over its entire length in front of the occupant. If it extends merely with a section in front of the occupant, this can be a section which adjoins the passage opening, or a section which forms the closed end of the additional restraining chamber, depending on whether, starting from the main restraining chamber, the additional restraining chamber extends with a direction component in the direction of the vehicle longitudinal axis (toward the front) or counter to the direction of the vehicle longitudinal axis (toward the rear). In the last-mentioned case, the section which extends in front of the occupant is formed by way of a region of the additional restraining chamber, which region adjoins the passage opening, the additional restraining chamber extending, starting from the main restraining chamber, obliquely upward and rearward.

Aspects of the invention also include embodiments in which the additional restraining chamber is provided and configured, in the inflated state, to extend, starting from the main restraining chamber, with a section in front of the occupant and with a further section to the side of the occupant, and to also restrain a sideward movement of the occupant in the process. For example, in the abovementioned example, in which the additional restraining chamber extends, starting from the main restraining chamber, obliquely upward and rearward, the closed end of the additional restraining chamber extends as a further section to the side of the occupant and ensures an additional restraint against a sideward movement.

A view along the vehicle transverse axis y of a vehicle, in which the airbag module is installed, is called a side view. The x-axis denotes the vehicle longitudinal axis. The z-axis denotes the vehicle vertical axis.

Here, the additional restraining chamber is preferably configured in such a way that one of its ends, in the unfurled and inflated state, acts in front of the shoulder or in front of the chest of the occupant in an accident situation.

One embodiment of the invention provides that, in the unfurled and inflated state of the airbag, the main restraining chamber comprises a main restraining chamber outer layer which faces away from the occupant and a main restraining chamber occupant layer which faces the occupant, which layers are connected to one another by means of a circumferential seam, the circumferential seam having an interruption which configures the passage opening. In accordance with this embodiment, the additional restraining chamber is attached at an opening of the main restraining chamber, which opening is formed by way of an interruption of the circumferential seam of the main restraining chamber. It is typically provided here that the additional restraining chamber likewise has a circumferential seam which is interrupted in the region of the passage opening.

This embodiment of the passage opening is to be understood as merely exemplary, however. Any constriction of the airbag can define a passage opening which separates a main restraining chamber and an additional restraining chamber of the airbag from one another. It can also be provided here, for example, that the passage opening is a constriction in an airbag which is woven in one piece.

The main restraining chamber and the additional restraining chamber are preferably connected fluidically to one another by means of the passage opening in such a way that filling of the additional restraining chamber by means of the gas generator takes place only after virtually complete filling of the main restraining chamber, as a result of which firstly protection in the case of a side impact is ensured by way of the main restraining chamber, and only afterward protection in the case of a frontal impact is ensured by way of the additional restraining chamber. It is to be noted here that it is obvious to a person skilled in the art that a throttling effect and therefore a speed and a pressure for filling the additional restraining chamber can also be set in a manner which is dependent on the size of the passage opening, as a result of which both chambers can also be utilized in the side impact for the protection of the occupant, but in a delayed manner.

In one embodiment, the additional restraining chamber is of tubular configuration with an open end, which is arranged at the passage opening of the main restraining chamber, and a closed end which lies opposite. This has the advantage that, despite subsequent filling of the additional restraining chamber, the latter is configured as rapidly as possible in terms of shape and position in the inflated state of the airbag by way of the arrangement of the passage opening on a side of the main restraining chamber, which side lies opposite the gas generator in the gas flow direction.

In other words, in order to ensure subsequent filling of the additional restraining chamber, the gas generator and the passage opening are preferably arranged at opposite ends of the main restraining chamber, the term "opposite" to be understood in such a way that the gas which exits from the gas generator in a gas flow direction reaches that region of the main restraining chamber last, in which the passage opening is configured.

If the additional restraining chamber is of tubular configuration with a closed end, one embodiment provides that the closed end overlaps with the main restraining chamber.

In a further embodiment, the main restraining chamber is designed in the region of the gas generator by way of woven fabric layers which are introduced on the inside, in such a way that, by way of a "constriction" of this type, a gas from the gas generator is divided into two gas streams in the case of the inflation of the airbag, as a result of which targeted and rapid filling of the main restraining chamber is ensured, while the additional restraining chamber is unfilled. A "constriction" of this type also serves to relieve any trim parts, since an expansion of the main restraining chamber to the gas generator is restricted spatially as a result.

In order to ensure this for different body sizes and as many body sizes of occupants as possible, in accordance with one embodiment of the invention, an additional restraining chamber axis which can be assigned to the additional restraining chamber is arranged at an angle of from 20 degrees to 70 degrees, preferably 45 degrees, with respect to the vertical direction or the horizontal direction of the airbag module which is installed into a motor vehicle. Here, the additional restraining chamber has a longitudinal extent which defines the additional restraining chamber axis. Here, said angle is the smaller of the two possible angles between the additional restraining chamber axis and the vertical or horizontal direction.

A possible tilting movement of the airbag to the vehicle outer side, for example in the case of a cabriolet or an open window, is also reduced by way of the L-shaped arrangement provided in this way of the additional restraining chamber.

It is conceivable in a further embodiment that the additional restraining chamber axis runs parallel to the vertical or horizontal direction of the airbag module which is installed into a motor vehicle. It is preferably provided here that the main restraining chamber likewise has a main restraining chamber axis which runs parallel to the vertical or horizontal direction, with the result that the additional restraining chamber axis and the main restraining chamber axis run parallel to one another.

In one preferred embodiment, in order to ensure production which is as simple as possible, the additional restraining chamber comprises an additional restraining chamber outer layer which faces away from the occupant and an additional restraining chamber occupant layer which faces the occupant. Here, the additional restraining chamber outer layer and the additional restraining chamber occupant layer are connected to one another by means of a circumferential seam, a sealing element, for example in the form of a silicone element or a seam tape or a/some offset stitched layer(s), preferably being arranged along the circumferential seam in order to ensure rapid unfurling of the additional restraining chamber. The circumferential seam of the additional restraining chamber has an interruption which configures the passage opening on the part of the additional restraining chamber.

As an alternative, the additional restraining chamber can be of tubular configuration from a woven fabric piece.

Here, in one preferred embodiment, the gas generator is arranged in a gas generator chamber, the gas generator chamber being configured as part of the main restraining chamber.

It is also conceivable that the main restraining chamber outer layer and the main restraining chamber occupant layer are configured from a single woven fabric layer, a fold about an axis of symmetry taking place in order to configure the main restraining chamber, as a result of which material can be saved for the seam and for the sealing element. Here, the gas generator chamber is preferably arranged in the region of the axis of symmetry.

In the same way as the main restraining chamber, it is also possible in one preferred embodiment that the additional restraining chamber outer layer and the additional restraining chamber occupant layer are configured from one woven fabric layer, a fold about an axis of symmetry taking place in order to configure the additional restraining chamber.

It also represents an advantage of embodiments of the airbag module that it can be used as a restraining system at different positions in a vehicle in a manner which is dependent on its installation position and orientation.

It is thus possible that, in the case of a vertically oriented gas generator, the airbag module is arranged in a backrest of a seat in such a way that a gas flow direction from the main restraining chamber into the additional restraining chamber through the passage opening takes place counter to a driving direction, with the result that the closed end of the additional restraining chamber is configured in the driving direction. Here, the airbag module according to the invention can be arranged on the left and/or on the right of a seat in each case in a mirror-symmetrical manner with respect to one another, the airbag module according to the invention acting as a center or central area airbag in the case of the arrangement of the airbag module between the vehicle occupants. The airbag module according to the invention can likewise be arranged on the seats which are arranged next to one another in one seat row, on the left and on the right on or in the backrests.

It is also conceivable, however, that the additional restraining chamber is arranged in such a way that the closed end of the additional restraining chamber is configured counter to the driving direction. In this case, the gas flow direction from the main restraining chamber into the additional restraining chamber through the passage opening takes place counter to a driving direction, with the result that the closed end of the additional restraining chamber is configured counter to the driving direction.

It is also possible that, in the case of a horizontally oriented gas generator, the airbag module is arranged in a door panel of a door frame or in a rear side trim panel or in a vehicle console or center console in such a way that a gas flow direction from the main restraining chamber into the additional restraining chamber through the passage opening takes place counter to a driving direction, with the result that the closed end of the additional restraining chamber is configured counter to the driving direction toward the occupant. In this case, the airbag module unfurls upward out of an associated trim part of the door frame or the vehicle console or possibly the center console. As a result of this arrangement, in the unfurled and inflated state of the airbag module, the main restraining chamber is positioned, for example, above the trim panel or the associated door panel or above the rear side trim panel, as a result of which protection is ensured in the case of a side impact. Restraining is ensured in the case of a frontal impact and an oblique load case as a result of the additional restraining chamber which is arranged so as to overlap with the main restraining chamber in a manner which is directed toward the occupant.

On account of the kinematics in the crash, the vehicle geometry and the head kinematics of the occupant lead to the head of an occupant being moved downward in the direction of the trim part and striking it, the exit of the airbag module from the trim part being predefined by way of a small opening in the latter, or else the trim part having a separate opening mechanism.

The advantage of the filling according to the invention of the additional restraining chamber lies in the fact that initially only the main restraining chamber is filled and positioned. During the filling of the main restraining chamber, the additional restraining chamber is also unfurled in an unfilled manner, as a result of which any additional forces on the trim part are avoided. As a consequence of the fold and unfurling, the additional restraining chamber is initially unfolded in an unfilled state, and is only subsequently filled. As a consequence of this, there is no loading of the occupant by way of an additional restraining chamber which is already filled and folds in the direction of the occupant. As a result of the connection of the main restraining chamber to the additional restraining chamber, the main restraining chamber presses the additional restraining chamber in the direction of the occupant. Moreover, the coupling ensures that the head of the occupant does not push the additional restraining chamber away downward, but rather the head of the occupant is caught and protected by the two chambers.

BRIEF DESCRIPTION OF THE FIGURES

For further explanation of an airbag module according to the invention, reference is made in the following part of the description to the figures, from which further advantageous embodiments, details and developments of the invention can be gathered, and in which.

WAYS OF IMPLEMENTING THE INVENTION

Figure 1:
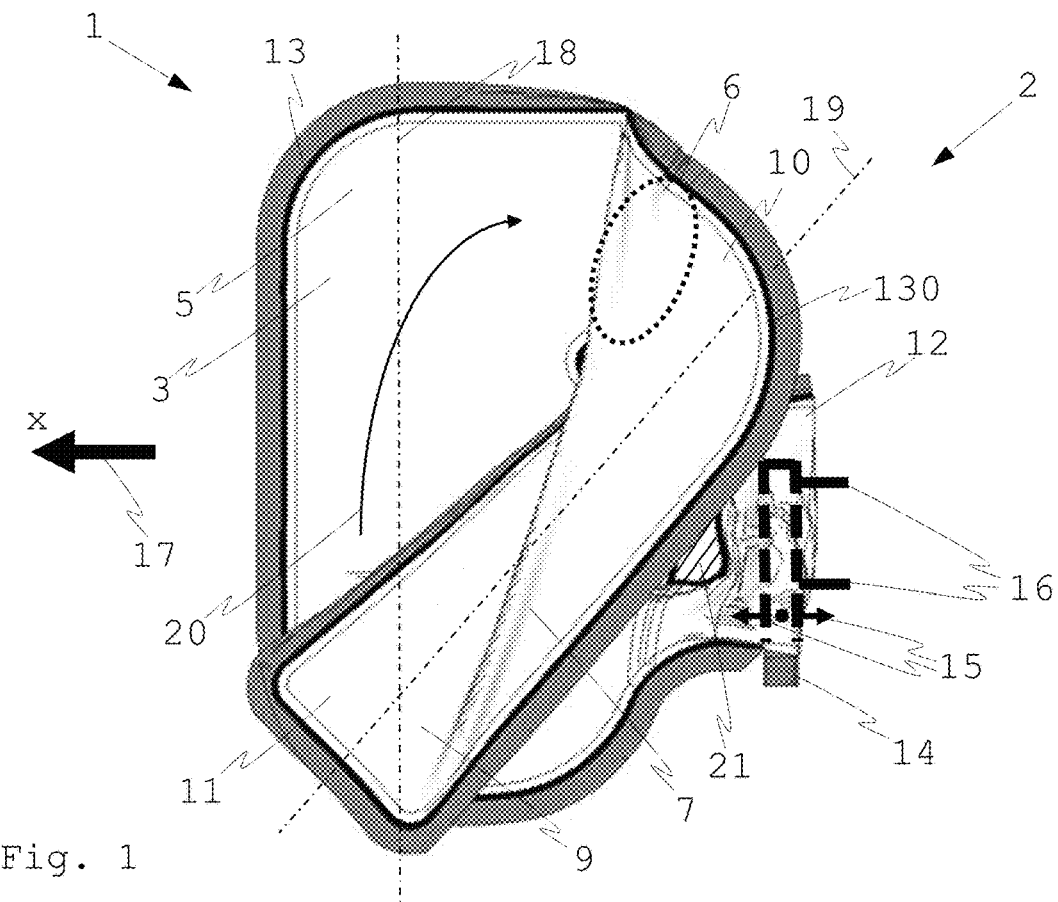
FIG. 1 shows a front view of the airbag module according to the invention in the unfurled and non-inflated state.
Figure 2:
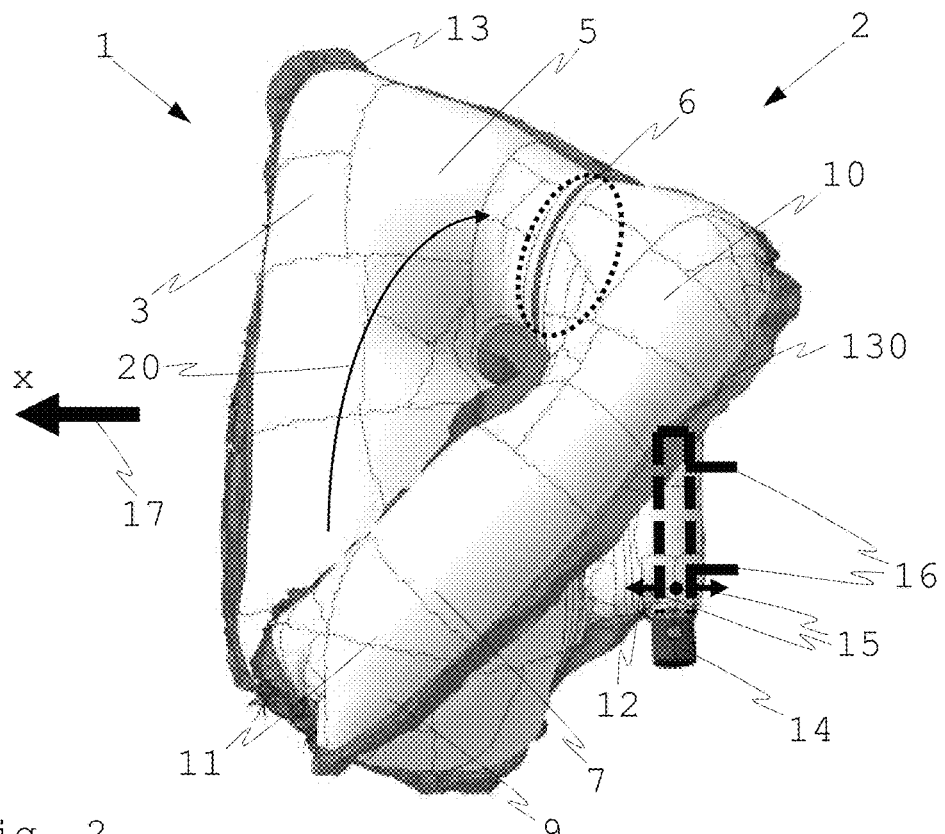
FIG. 2 shows a front view of the airbag module according to the invention in the unfurled and inflated state.

FIG. 1 and FIG. 2 show an airbag module 1 according to the invention in a vertical orientation, as a result of which a gas generator 14 is arranged perpendicularly with respect to a driving direction 17 (in the case of a forward movement of a vehicle), FIG. 1 showing merely the unfurled airbag module 1, whereas FIG. 2 shows the airbag module 1 in the inflated state. Here, the driving direction 17 is identical to the vehicle longitudinal axis x of a vehicle, into which the airbag module 1 is installed.

Here, FIGS. 1 and 2 show one design variant, in the case of which the airbag unfurls as a center airbag to the right of the driver or as a side airbag to the right of the front seat passenger between the front seat passenger and the window pane.

In the case of an arrangement of this type, the gas generator outflow opening 15 is oriented at least partially parallel to the driving direction 17, the gas generator 14 expelling gas radially around the gas generator 14 by means of the gas generator outflow opening 15. In detail, in addition to the gas generator 14, the airbag module 1 comprises an airbag 2 which contains a main restraining chamber 3 and an additional restraining chamber 7, the main restraining chamber 3 having a main restraining chamber outer layer 4 which faces away from the occupant in the unfurled and inflated state of the airbag 2, and a main restraining chamber occupant layer 5 which faces the occupant, which layers are connected to one another by means of a circumferential seam 13.

The additional restraining chamber 7 likewise has an additional restraining chamber outer layer 8 (see FIGS. 11 and 12) and an additional restraining chamber occupant layer 9, which layers are connected to one another by means of a circumferential seam 130.

A passage opening 6 is configured between the main restraining chamber 3 and the additional restraining chamber 7. In the exemplary embodiment which is shown, said passage opening 6 is configured by way of an interruption in the circumferential seam 13 and a corresponding interruption in the circumferential seam 130, with the result that the main restraining chamber 3 and the additional restraining chamber 7 are connected fluidically to one another by means of the passage opening 6. Here, the respective layers 4, 8 and 5, 9 of the main restraining chamber 3 and the additional restraining chamber 7 are sewn, adhesively bonded or connected in some other way to one another in the region of the passage opening.

As an alternative, the passage opening 6 is formed by way of a constriction in the airbag or by way of a hole in the main restraining chamber 3, which hole is adjoined by the additional restraining chamber 7 in a case of this type.

The additional restraining chamber 7 and the main restraining chamber 3 are arranged in an at least partially overlapping manner with respect to one another, and the additional restraining chamber 7 is arranged toward the occupant.

The airbag module 1 is preferably installed in a seat or a backrest of a seat, a gas generator 14 which is preferably arranged in a gas generator chamber 12 which is part of the main restraining chamber 3 being arranged on the seat or the backrest by means of bolts or screws as gas generator fastening 16, as a result of which the entire airbag module 1 is fastened to the seat or the backrest by means of the gas generator fastening 16. Here, a recess or a dead region 21 (region which cannot be filled) serves to disconnect the gas generator chamber 12 from the remaining main restraining chamber 3, it also being possible that the gas generator 14 is arranged directly in the main restraining chamber 3 without any gas generator chamber 12 and dead region 21 and, in this case, the gas generator chamber 12 is configured as part of the main restraining chamber 3. Here, the additional restraining chamber 7 is of tubular configuration with an open end 10 which is arranged at the passage opening 6 of the main restraining chamber 3, and an opposite closed end 11, the closed end 11 being arranged in an overlapping manner with the main restraining chamber 3. An additional restraining chamber axis 19 is defined by way of the elongate tubular shape of the additional restraining chamber 7.

In detail, the passage opening 6 is arranged on a side of the main restraining chamber 3, which side lies opposite the gas generator 14 in the gas flow direction 20, as a result of which the gas flow direction 20 from the main restraining chamber 3 into the additional restraining chamber 7 through the passage opening 6 is brought about counter to a driving direction 17, the closed end 11 of the additional restraining chamber 7 being configured or pointing in the driving direction 17. In other words, the gas generator 14 and the passage opening 6 are arranged at opposite ends of the main restraining chamber 3.

Figure 3:
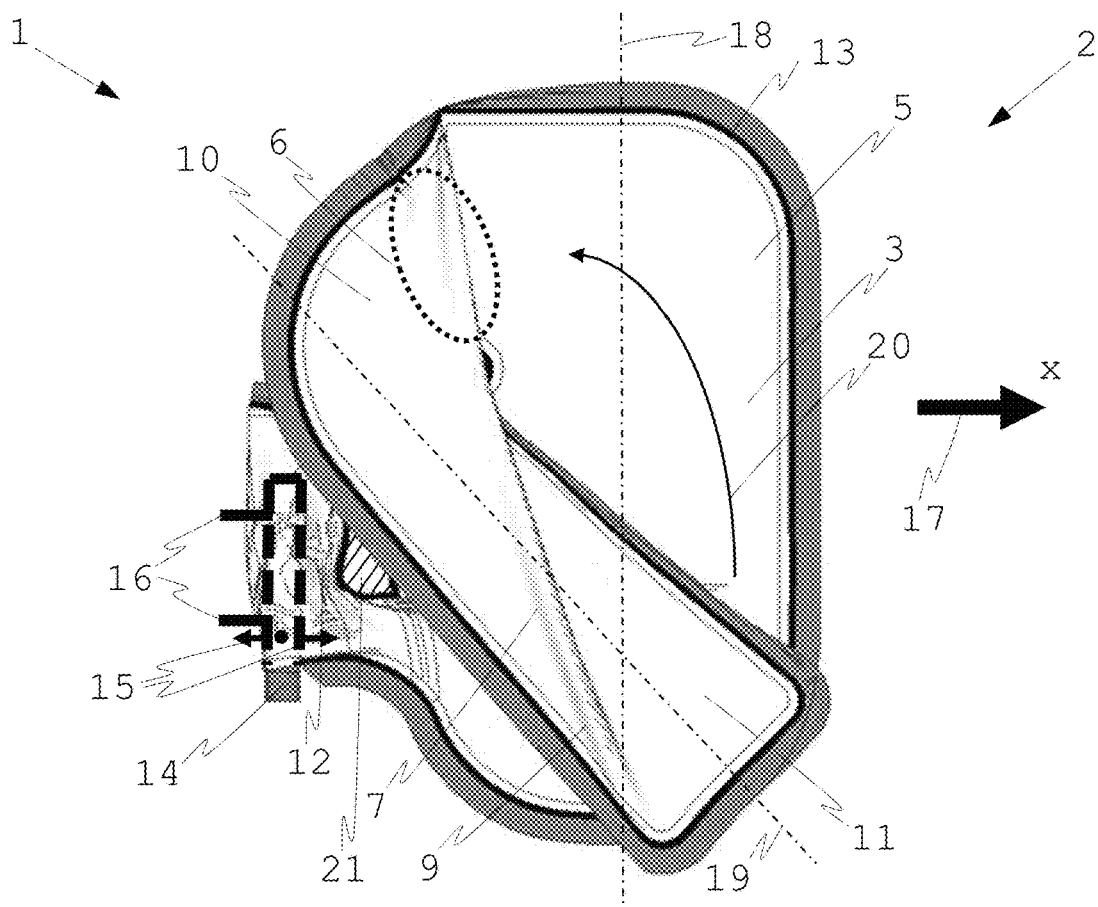
FIG. 3 shows a front view of the airbag module according to the invention in the unfurled and non-inflated state (mirror-inverted arrangement of the airbag module from FIG. 1)
Figure 4:
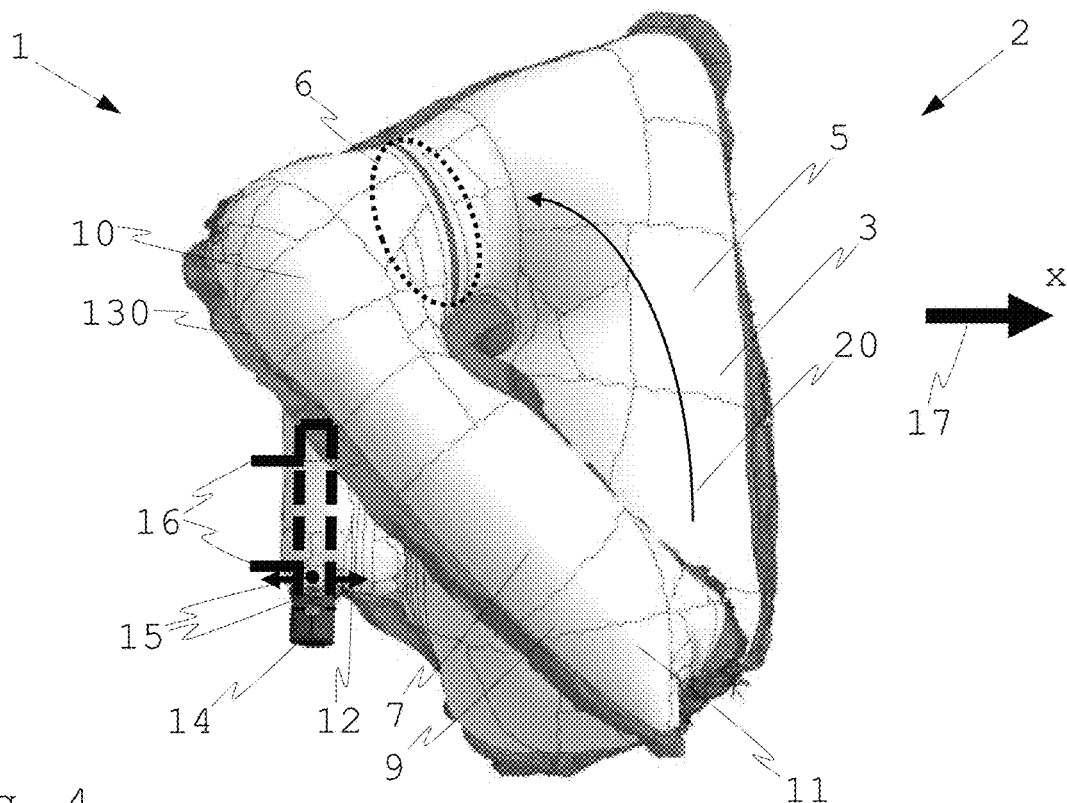
FIG. 4 shows a front view of the airbag module according to the invention in the unfurled and inflated state (mirror-inverted arrangement of the airbag module from FIG. 2)
Figure 5:
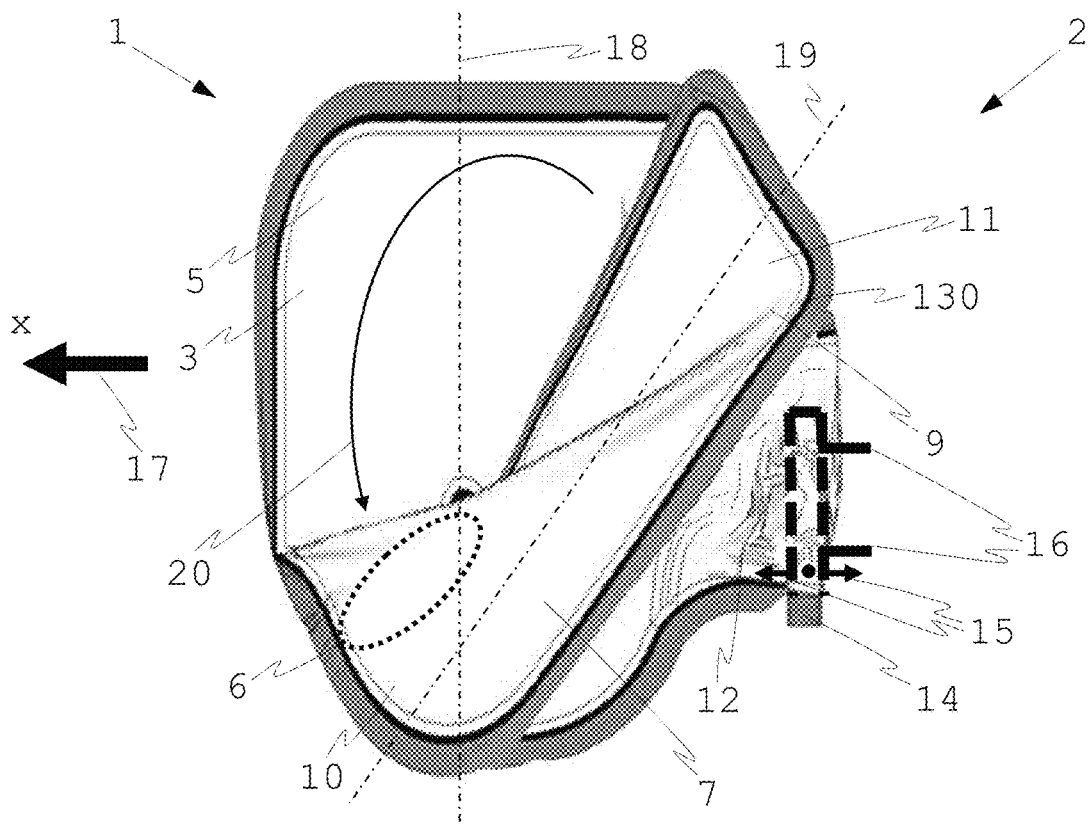
FIG. 5 shows a front view of the airbag module according to the invention in the unfurled and non-inflated state (with an upwardly oriented additional restraining chamber)
Figure 6:
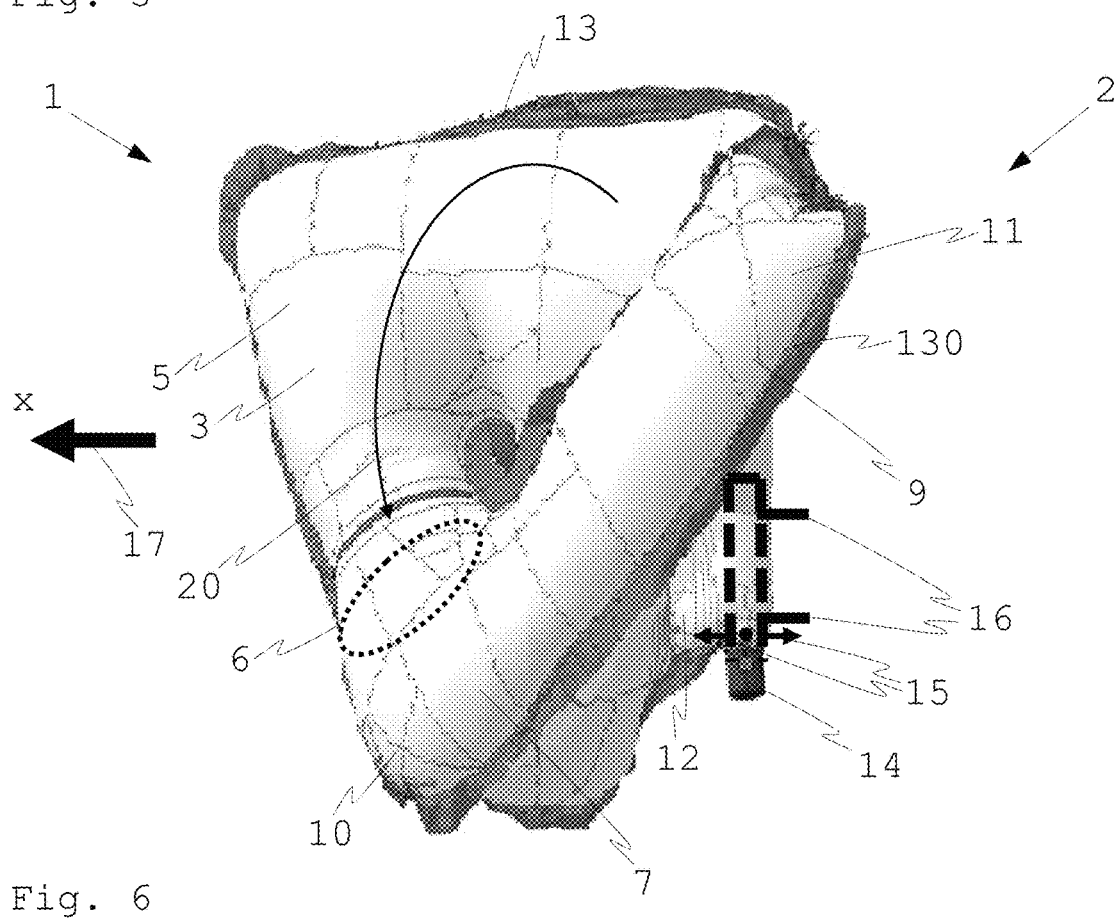
FIG. 6 shows a front view of the airbag module according to the invention in the unfurled and inflated state (with an upwardly oriented additional restraining chamber)

According to the invention, however, it is also possible in accordance with FIG. 5 and FIG. 6 that the additional restraining chamber 7 which is shown in FIG. 1 to FIG. 4 is oriented in the direction of the roof liner, as a result of which the closed end 11 of the additional restraining chamber 7 is configured or points counter to the driving direction 17, it also being arranged, however, in an overlapping manner with the main restraining chamber 3 in this embodiment.

In this case, the gas flow direction 20 from the main restraining chamber 3 into the additional restraining chamber 7 through the passage opening 6 is brought about counter to a driving direction 17, with the result that the closed end 11 of the additional restraining chamber 7 is configured counter to the driving direction 17. The end 11 comes into contact, for example, in front of the chest of an occupant to be protected, the additional restraining chamber 7 preventing or reducing a forward movement of the occupant to be protected.

It can be seen here in FIG. 1 and FIG. 2 that the additional restraining chamber 7 and the main restraining chamber 3 are arranged so as to at least partially overlap with respect to one another, the additional restraining chamber 7 being arranged toward the occupant, in particular if the airbag module 1 is used as an interaction or center airbag, in order to ensure restraining of the occupant in the case of any frontal forces in an accident situation, and therefore primarily restrains a forward movement of an occupant. Here, the additional restraining chamber axis 19 which can be assigned to the additional restraining chamber 7 is oriented at an angle of from 20 degrees to 70 degrees, preferably 45 degrees, with respect to the vertical direction, said angle being the smaller of the two possible angles with respect to the vertical direction.

It can be provided that the main restraining chamber 3 likewise has a longitudinal extent which defines a main restraining chamber axis 18. It is thus in the exemplary embodiments which are shown, but does not necessarily have to be thus. It is the case here that the main restraining chamber axis 18 runs in the vertical direction, with the result that said angle of from 20 degrees to 70 degrees, preferably 45 degrees, with respect to the main restraining chamber axis 18 is present.

An angle of this type brings about an increased restraining force of the additional restraining chamber 7 in an accident situation, since, for example in the case of a parallel design of the additional restraining chamber 7 with respect to the main restraining chamber 3, the head of the occupant would possibly push the additional restraining chamber 7 to the side in the case of an accident.

It is conceivable in a further embodiment according to the invention, however, that the additional restraining chamber axis 19 is arranged parallel to the main restraining chamber axis 18 which can be assigned to the main restraining chamber 3. Exemplary embodiments in this regard will be described on the basis of FIGS. 9 and 10.

As has already been explained, the additional restraining chamber 7 comprises, in one preferred embodiment, an additional restraining chamber outer layer 8 which faces away from the occupant and an additional restraining chamber occupant layer 9 which faces the occupant, which layers are connected to one another by means of the circumferential seam 130.

In order to ensure rapid filling of the airbag 2, a sealing element, preferably in the form of a silicone element or a seam tape or a/some offset stitched layer(s), is arranged along the circumferential seam 13 here.

It is also possible in one alternative embodiment that the main restraining chamber outer layer 4 and the main restraining chamber occupant layer 5 are configured from one woven fabric layer, a fold about an axis of symmetry taking place in order to configure the main restraining chamber 3, the gas generator chamber 12 being arranged in the region of the axis of symmetry in this case. In the same way, it is also conceivable that the additional restraining chamber outer layer 8 and the additional restraining chamber occupant layer 9 are configured from one woven fabric layer, a fold about an axis of symmetry taking place in order to configure the additional restraining chamber 7. In both cases, the circumferential seam 13, 130 is attached to the axis of symmetry which is produced by way of folding, with the result that the circumferential seam can be of shorter configuration.

FIG. 3 and FIG. 4 in each case show an airbag module 1 according to the invention in a mirror-inverted embodiment with respect to FIG. 1 and FIG. 2, FIG. 3 showing the unfurled airbag module 1 in an identical manner with respect to FIG. 1, whereas FIG. 4 shows the airbag module 1 in the unfurled and inflated state in an identical manner with respect to FIG. 2. Here, the airbag unfurls, for example, as a center airbag to the left of the front seat passenger or as a side airbag to the left of the driver between the driver and the window pane.

Figure 7:
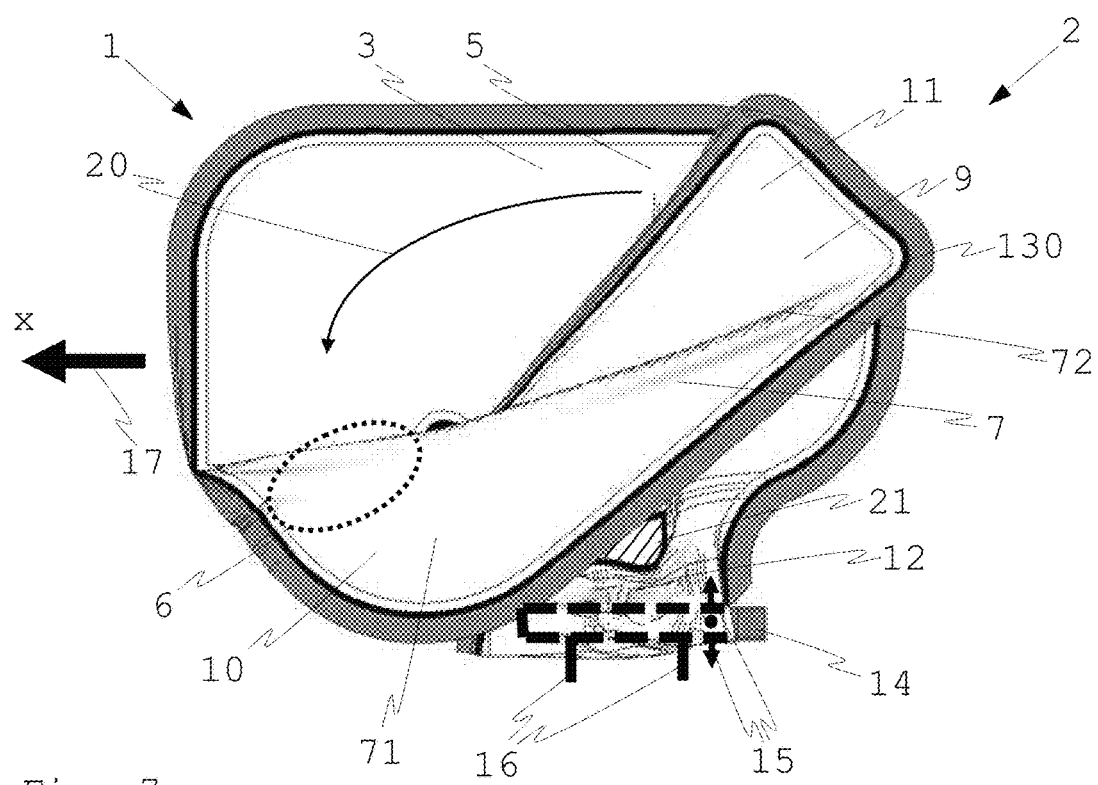
FIG. 7 shows a front view of the airbag module according to the invention in the unfurled and non-inflated state (horizontal orientation of the airbag module)
Figure 8:
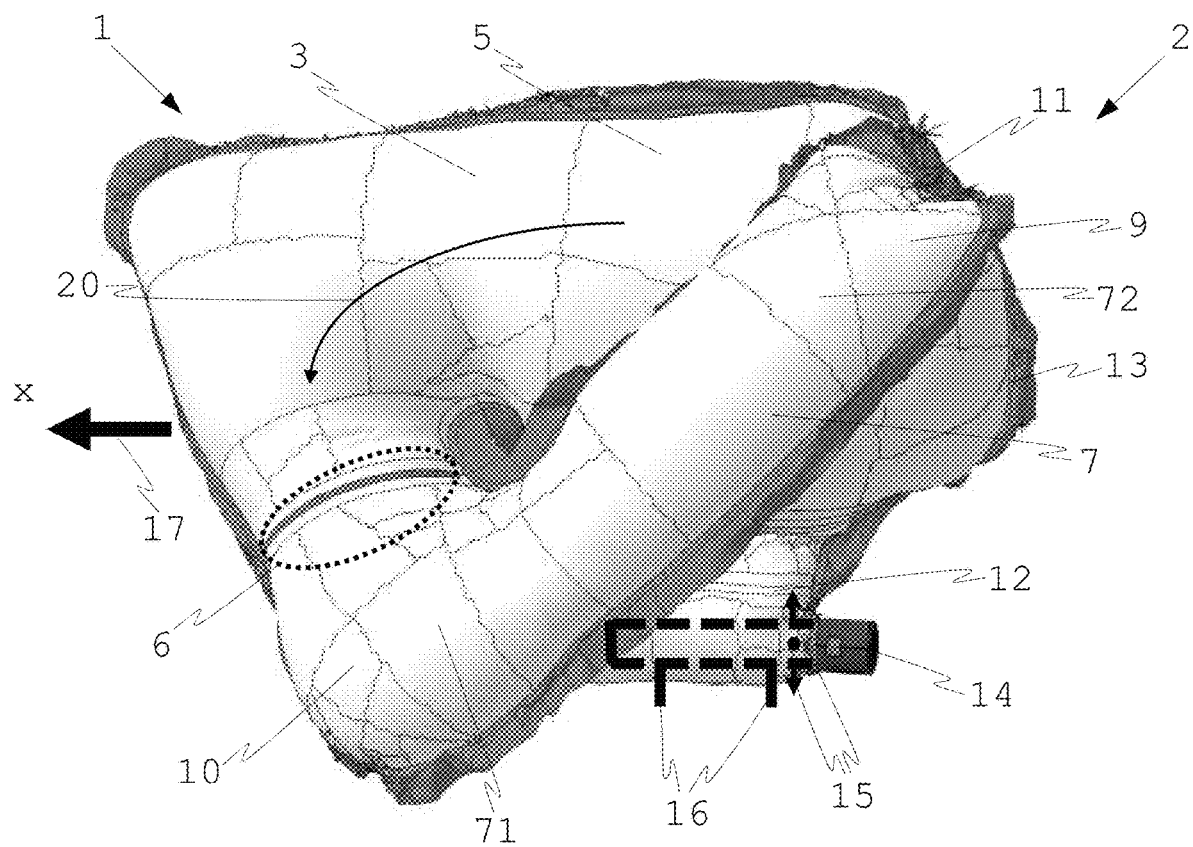
FIG. 8 shows a front view of the airbag module according to the invention in the unfurled and inflated state (horizontal orientation of the airbag module)

FIG. 7 and FIG. 8 show an airbag module 1 according to the invention in a horizontal orientation, as a result of which a gas generator 14 is arranged in the driving direction 17 or in the direction of the vehicle longitudinal axis x, FIG. 7 showing merely the unfurled airbag module 1, whereas FIG. 8 shows the airbag module 1 in the unfurled and inflated state. In terms of the construction, the airbag module of FIGS. 7 and 8 corresponds to the airbag module of FIGS. 3 and 4 rotated by 90°.

Here, in the case of the horizontally oriented gas generator 14, the airbag module 1 is preferably arranged in a door panel of a door frame or in a rear side trim panel or in a vehicle console in such a way that a gas flow direction 20 from the main restraining chamber 3 into the additional restraining chamber 7 through the passage opening 6 is brought about counter to a driving direction 17, with the result that the closed end 11 of the additional restraining chamber 7 is configured counter to the driving direction 17 toward the occupant. The gas generator outflow opening 15 is perpendicular with respect to the driving direction 17 in this case. In this case, the airbag module 1 unfurls upward out of an associated trim part of the door frame or the rear side trim panel or the vehicle console or possibly the center console. Here, the orientation in FIGS. 7 and 8 is such that the unfurling of the airbag takes place out of the right-hand rear side trim panel or the right-hand door frame, in order to protect a front seat passenger seated on the right. As an alternative, the unfurling takes place out of the vehicle console or possibly the center console, in order to protect the driver seated on the left or the front seat passenger seated at the rear left. According to FIG. 8, the closed end 11 of the additional restraining chamber 7 ends in the region of the chest or shoulder of the occupant, and primarily brings about the reduction of a forward movement of an occupant. Here, the closed end 11 overlaps with the main restraining chamber 3 which is arranged offset in the y-direction and protects the occupant with regard to a sideward movement.

Here, one design variant provides that only a first section 71 of the additional restraining chamber 7, which first section 71 adjoins the passage opening 6 to the main restraining chamber 3, extends in front of the occupant and serves to restrain a forward movement of the occupant. A second section 72 of the additional restraining chamber 7, which second section 72 is formed by way of the closed end 11 of the additional restraining chamber 7, extends in contrast to the side of the occupant, with the result that it provides additional restraint against a sideward movement of the occupant. A division of this type of the additional restraining chamber 7 into a section which extends in front of the occupant and a further section which extends to the side of the occupant is also possible as a design variant in the case of the further described exemplary embodiments.

Figure 9:
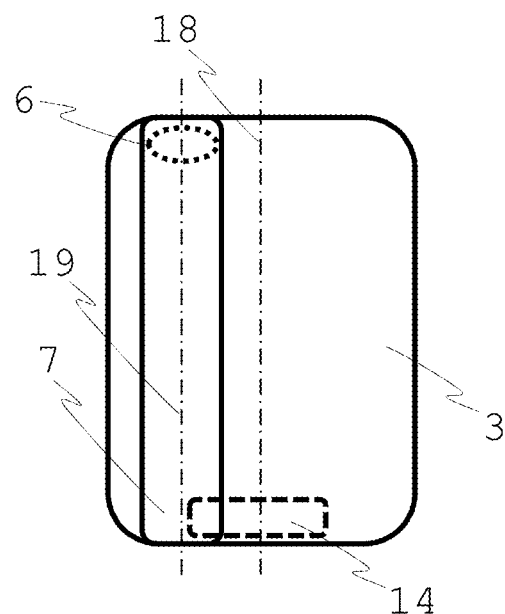
FIG. 9 shows one exemplary embodiment of the airbag module according to the invention, in the case of which the main restraining chamber and the additional restraining chamber are arranged parallel to one another and run vertically here.

FIG. 9 shows one exemplary embodiment, in the case of which the main restraining chamber 3 and the additional restraining chamber 7 configure a main restraining chamber axis 18 and an additional restraining chamber axis 19. Here, the respective axis 18, 19 is defined by way of a main longitudinal extent of the respective chamber 3, 7. The additional restraining chamber axis 19 is thus defined by way of the elongate tubular shape of the additional restraining chamber 7.

It can be seen clearly that the gas generator 14 in the main restraining chamber 3 and the passage opening 6 are arranged at opposite ends of the airbag, in so far as the gas which flows out of the gas generator 14 has to flow through the entire length of the main restraining chamber 3 before it reaches the throughflow opening 6 and can flow from the latter into the additional restraining chamber 7.

In FIG. 9, both the main restraining chamber axis 18 and the additional restraining chamber axis 19 run in the vertical direction, that is to say in the direction of the vehicle vertical axis. There is an orientation of this type, in particular, when the gas generator is arranged in the backrest of a vehicle seat in a substantially vertical orientation.

Figure 10:
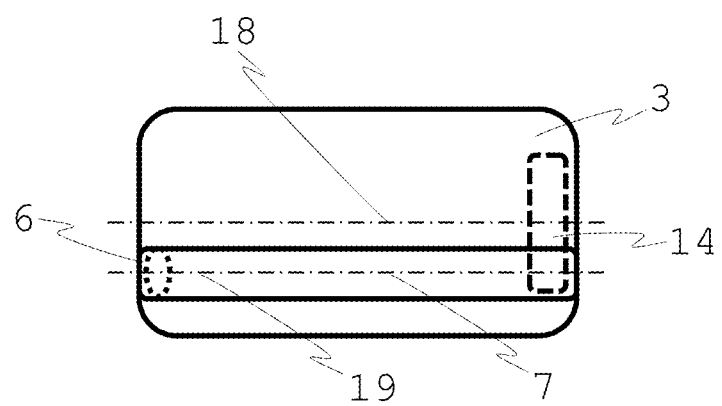
FIG. 10 shows one exemplary embodiment of the airbag module according to the invention, in the case of which the main restraining chamber and the additional restraining chamber are arranged parallel to one another and run horizontally here.

FIG. 10 shows one design variant, in the case of which, just like in the case of FIG. 9, a main restraining chamber axis 18 and an additional restraining chamber axis 19 run parallel to one another. Here, the two axes 18, 19 run in the horizontal direction, however. Otherwise, the arrangement is the same as in FIG. 9. There is an orientation of this type, in particular, when the gas generator is arranged in a door panel of a door frame or in a rear side trim panel or in a vehicle console in a substantially horizontal orientation.

Figure 11:
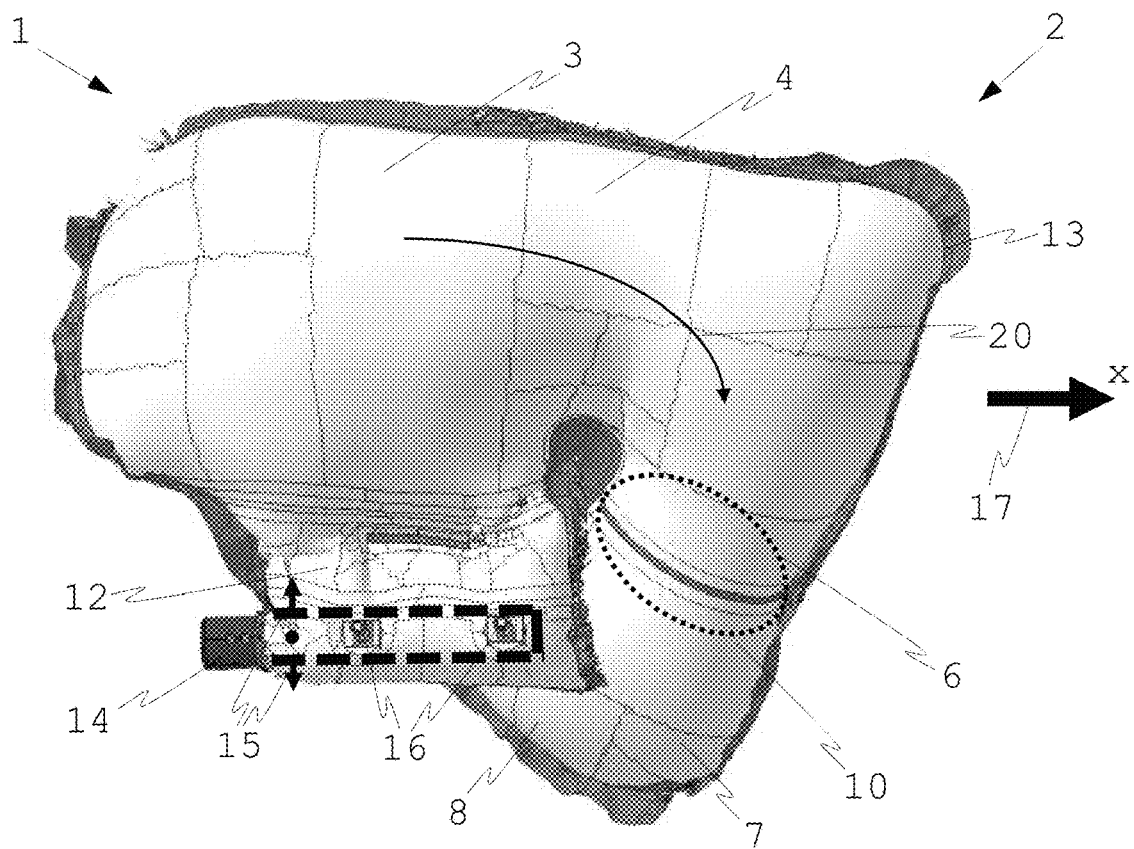
FIG. 11 shows a rear view of the airbag module according to the invention in accordance with FIG. 8.

FIG. 11 shows a rear view of the airbag module 1 according to the invention in accordance with FIG. 6; it can be seen clearly that the passage opening 6 is arranged on a side of the main restraining chamber 3, which side lies opposite the gas generator 14 in the gas flow direction 20, as a result of which the gas flow direction 20 from the main restraining chamber 3 into the additional restraining chamber 7 through the passage opening 6 is brought about in the driving direction 17. As a result of this arrangement, the gas which flows out of the gas generator 14 from the gas generator outflow opening 15 covers approximately the furthest path until filling of the additional restraining chamber 7, as a result of which delayed filling of the additional restraining chamber 7 is ensured.

Figure 12:
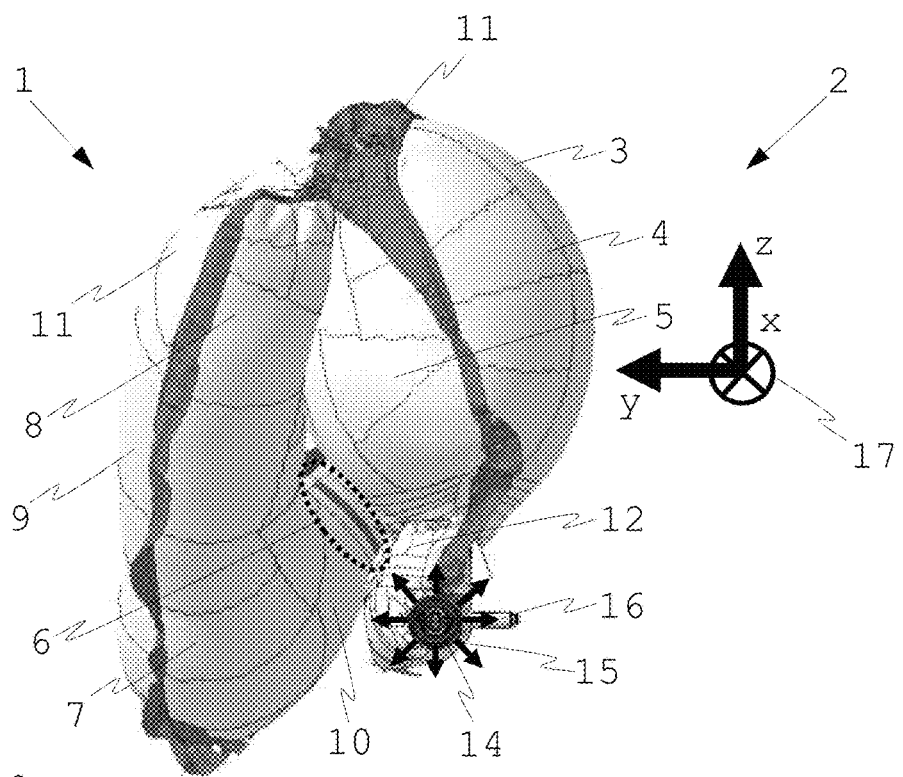
FIG. 12 shows a view from behind in the driving direction of the airbag module according to the invention in accordance with FIG. 8 and FIG. 11.

FIG. 12 shows a view from behind in the driving direction 17 of the airbag module 1 according to the invention in accordance with FIG. 7 and FIG. 8 (in the case of a forward movement of the vehicle); the overlap of the additional restraining chamber 7 with the main restraining chamber 3 can be seen. The main restraining chamber 3 and the additional restraining chamber 7 are spaced apart in the vehicle transverse direction y, and are of at least partially laterally offset configuration in different x-z planes. In the side view (that is to say, in the direction of the vehicle transverse axis y), the additional restraining chamber 7 and the main restraining chamber 3 lie partially behind one another. As a result, different functions of the main restraining chamber 3 and the additional restraining chamber 7 are made possible, namely protection of the occupant against a sideward movement by way of the main restraining chamber 3 and protection of the occupant against a forward movement by way of the additional restraining chamber 7.

The invention claimed is:

1. An airbag module for a motor vehicle with a vehicle longitudinal axis (x), a vehicle transverse axis (y) and a vehicle vertical axis (z), wherein the vehicle longitudinal axis (x) defines a forward driving direction, the airbag module being configured for the reduction of an abrupt sideward and forward movement of an occupant during an impact, the airbag module comprising:
  an airbag which can be inflated by means of a gas generator during an accident situation, wherein the inflated airbag is in an inflated state, the airbag including:
  a main restraining chamber; and
  an additional restraining chamber connected to the main restraining chamber by way of a passage opening, wherein:
    the main restraining chamber is provided and configured, in the inflated state, to restrain a sideward movement of an occupant, and
    the additional restraining chamber is provided and configured, in the inflated state, to extend, starting from the main restraining chamber, at least with a section in front of the occupant and to restrain at least a forward movement of the occupant, the additional restraining chamber and the main restraining chamber being arranged so as to overlap one another at least partially in the sense that they are configured at least partially behind one another in side view along the vehicle transverse axis (y),
  wherein the main restraining chamber and the additional restraining chamber are connected fluidly to one another by means of the passage opening,
  wherein the additional restraining chamber is of a tubular configuration with an open end, which is arranged at the passage opening of the main restraining chamber, and a closed end which lies opposite, and
  wherein the airbag module is configured such that, in the inflated state, the closed end of the tubular additional restraining chamber is configured counter to the forward driving direction toward the occupant.

2. The airbag module as claimed in claim 1, wherein, in the ≤inflated state of the airbag, the main restraining chamber comprises a main restraining chamber outer layer which is configured to face away from the occupant and a main restraining chamber occupant layer which is configured to face the occupant, which layers are connected to one another by means of a circumferential seam, the circumferential seam having an interruption which configures the passage opening.

3. The airbag module as claimed in claim 2, wherein the main restraining chamber outer layer and the main restraining chamber occupant layer are configured from one woven fabric layer, a fold about an axis of symmetry taking place in order to configure the main restraining chamber.

4. The airbag module as claimed in claim 3, wherein the gas generator chamber is arranged in the region of the axis of symmetry.

5. The airbag module as claimed in claim 1, wherein the passage opening is configured in a region of the main restraining chamber, which region faces away from the gas generator in the sense that the gas which exits from the gas generator in a gas flow direction reaches that region of the main restraining chamber last, in which the passage opening is configured.

6. The airbag module as claimed in claim 1, wherein the gas generator and the passage opening are arranged at ends of the main restraining chamber which are arranged so as to lie opposite one another.

7. The airbag module as claimed in claim 1, wherein the additional restraining chamber has a longitudinal extent which defines an additional restraining chamber axis which can be assigned to the additional restraining chamber, the additional restraining chamber axis running at an angle of from 20 degrees to 70 degrees with respect to the vertical or horizontal direction of the airbag module which is installed into a motor vehicle.

8. The airbag module as claimed in claim 1, wherein the additional restraining chamber comprises an additional restraining chamber outer layer which faces away from the occupant and an additional restraining chamber occupant layer which faces the occupant.

9. The airbag module as claimed in claim 8, wherein the additional restraining chamber outer layer and the additional restraining chamber occupant layer are connected to one another by means of a circumferential seam, the circumferential seam having an interruption which configures the passage opening on the part of the additional restraining chamber.

10. The airbag module as claimed in claim 8, wherein the additional restraining chamber outer layer and the additional restraining chamber occupant layer are configured from one woven fabric layer, a fold about an axis of symmetry taking place in order to configure the additional restraining chamber.

11. The airbag module as claimed in claim 9, wherein a sealing element is arranged along the circumferential seam.

12. The airbag module as claimed in claim 1, wherein the gas generator is arranged in a gas generator chamber.

13. The airbag module as claimed in claim 12, wherein the gas generator chamber is configured as part of the main restraining chamber.

14. The airbag module as claimed in claim 1, wherein the airbag module is provided and configured to be arranged with a vertically oriented gas generator in a backrest of a seat in such a way that a gas flow direction from the main restraining chamber into the additional restraining chamber through the passage opening takes place counter to the forward driving direction.

15. The airbag module as claimed in claim 1, wherein the airbag module is provided and configured to be arranged with a horizontally oriented gas generator in a door panel of a door frame or in a rear side trim panel or in a vehicle console in such a way that a gas flow direction from the main restraining chamber into the additional restraining chamber through the passage opening takes place counter to the forward driving direction.

16. The airbag module as claimed in claim 1, wherein the closed end of the tubular additional restraining chamber is configured so as to overlap with the main restraining chamber.

17. The airbag module as claimed in claim 1, wherein the additional restraining chamber is provided and configured, in the inflated state, to extend, starting from the main restraining chamber, with a section in front of the occupant and with a further section to the side of the occupant, and by this to also restrain a sideward movement of the occupant.

18. The airbag module as claimed in claim 1, wherein, in the inflated state, the main restraining chamber and the additional restraining chamber are configured at least partially offset laterally in different planes which are defined by way of the vehicle longitudinal axis (x) and the vehicle vertical axis (z).

* * * * *